United States Patent [19]
Brandt

[11] 3,956,116
[45] May 11, 1976

[54] PROCESS FOR SEPARATING LIQUIDS FROM SUSPENSIONS

[75] Inventor: L. Warren Brandt, Tuscaloosa, Ala.

[73] Assignee: The United States of America as represented by the Secretary of the Interior, Washington, D.C.

[22] Filed: Oct. 16, 1974

[21] Appl. No.: 515,390

[52] U.S. Cl. .................................. 210/42 R; 210/77
[51] Int. Cl.² .......................................... B01D 5/00
[58] Field of Search ................. 210/42, 54, 73, 169, 210/207, 297, 299, 310, 65, 77, 359; 209/29, 52, 392, 401

[56] References Cited
UNITED STATES PATENTS

| | | | |
|---|---|---|---|
| 349,675 | 9/1886 | Woolley | 209/392 |
| 1,861,469 | 6/1932 | Curtis | 210/297 |
| 2,367,997 | 1/1945 | Chambers | 210/169 |
| 3,707,523 | 12/1972 | Ledden | 210/54 |
| 3,840,118 | 10/1974 | Whitmore | 210/297 |

FOREIGN PATENTS OR APPLICATIONS

| | | | |
|---|---|---|---|
| 736,190 | 9/1955 | United Kingdom | 209/401 |
| 1,039,495 | 9/1958 | Germany | 210/299 |

OTHER PUBLICATIONS

Perry's Chemical Engineering Handbook 4th Edition, McGraw Hill, 1963, pp. 21–53.
Schenk, "Controlled Hydraulics on Flat Screens for Improved Pulp Production and Quality," Paper Trade Journal, Vol. 118, No. 19, pp. 183–766, May 11, 1944.

Primary Examiner—Charles N. Hart
Assistant Examiner—Ernest G. Therkorn
Attorney, Agent, or Firm—Roland H. Shubert; Donald R. Fraser

[57] ABSTRACT

Process for separating liquids from suspensions of ultrafine solids by moving a shearing device, such as a screen, through the suspension to concentrate the solids and permit the removal of the separated liquids.

7 Claims, 3 Drawing Figures

PROCESS FOR SEPARATING LIQUIDS FROM SUSPENSIONS

BACKGROUND OF THE INVENTION

There are many commercial engineering operations as well as many laboratory operations that produce suspensions of ultrafine solids in a liquid medium where the solid particles are very small and impart slow settling characteristics to the suspension. Such systems may be termed colloidal suspensions and frequently are called slimes in mining operations. A typical example of the latter is the by-product produced from mining phosphates in Florida for use in producing fertilizers, phosphoric acid, or other phosphorous compositions. The phosphate occurs naturally with clays and after treatment to recover as much of the phosphate as possible, there is usually a byproduct slime containing 2–6 percent solid material and the remainder water. The solids will not settle in any reasonable length of time to permit recovery of the water or of the solids which often contain significant amounts of valuable minerals. Many methods have been suggested for separating the liquid from the solids in such suspensions or slimes, among which are flocculation followed by precipitation or filtration, evaporation, centrifugation, freezing and thawing, and treatment with polyelectrolytes followed by precipitation. While these procedures may provide some advantages in effecting a separation they each have certain disadvantages which restrict the process to particular applications or which cause the process to be too expensive for general use.

BRIEF SUMMARY OF INVENTION

This invention relates to a process for accelerating the separation of liquid from solids in a very slow-settling suspension or a slime, by means of a single mechanical operation which effects the compaction of the solids in a relatively short period of time. The process involves the movement of a relatively large mesh screen or net through the suspension at a slow steady rate with the result that the solid material is concentrated or compacted ahead of the moving screen leaving a clarified liquid behind the moving screen. In some instances, there may be a flocculant material employed as an aid in agglomerating the ultrafine solids, but this is not a step which is necesssary to the process of this invention. This process has been employed successfully with phosphate slimes resulting from commercial mining operations in Florida, and it has been found to be feasible to concentrate the solid materials to a much greater degree and in a much shorter period of time than has been possible without the use of expensive machinery or additives.

It is an object of this invention to provide a rapid method for separating liquid from solids in very slow-settling suspension without the necessity of employing chemical additives or using centrifuges or filters.

Another object of this invention is to provide an improved process for treating phosphate slime to recover clarified water and concentrated minerals therefrom.

Figure 1:
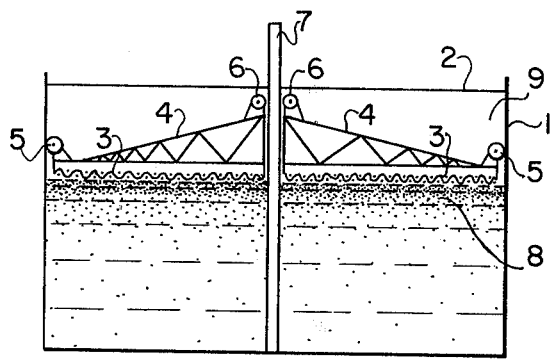
FIG. 1 is an embodiment of this invention wherein a tank is filled with a very slow-settling suspension which is to be separated and a screen is moved downwardly through the suspension in that tank in order to effect the separation.

With specific reference to FIG. 1 a tank of any convenient size is represented at 1 and is filled with a very slow-settling suspension to a level at 2. This suspension is treated by the process of this invention by moving screen 3 downwardly through the depth of the liquid to whatever concentration is deemed to be advisable. The method shown for operating the process of this invention in this embodiment involves a central guide rod 7 and supporting structure 4 to which screen 3 is attached. Guide rollers 5 and 6 maintain the supporting structure 4 and screen 3 in a position perpendicular to guide rod 7 as screen 3 moves downwardly through the suspension. The means for actually moving the screen 3 and supporting structure 4 is not shown in this sketch because any of a variety of alternatives may be employed. For example the supporting structure 4 may be lowered at a desired rate by reason of its own weight attached to cables and appropriate pulleys over the upper edge of tank 1 to a suitable winch or winches located outside the tank. Another alternative is to provide a driving arrangement of suitable gearing which connects guide rod 7 and /or tank 1 with moveable supporting structure 4. Still other driving means are hydraulic pistons connected to the wall of tank 1 in a manner which forces supporting structure 4 downward at any given rate of movement. The exact means employed for moving supporting structure 4 and screen 3 is completely unimportant to the present invention since any suitable means may be employed. As screen 3 moves downward it produces a concentration of solids at 8 immediately ahead of screen 3 and leaves a clarified supernatant behind at 9, which can be pumped off (by means not shown) as the process proceeds.

A desirable additional feature (not illustrated here) to be employed in the embodiment of FIG. 1 is a rotating thickener rake in the bottom of tank 1. The rake is of conventional design with blades set at an angle so as to scrape the concentrated solids toward the center where they are removed continuously. In this invention the blades are made of screen material similar to that of screen 3 so that water may pass through the blade and solids may be concentrated by the movement of the blade. The speed of blade movement sould be the same relative linear speed as that of screen 3 moving downward through the slow-settling suspension in tank 1.

Figure 2:
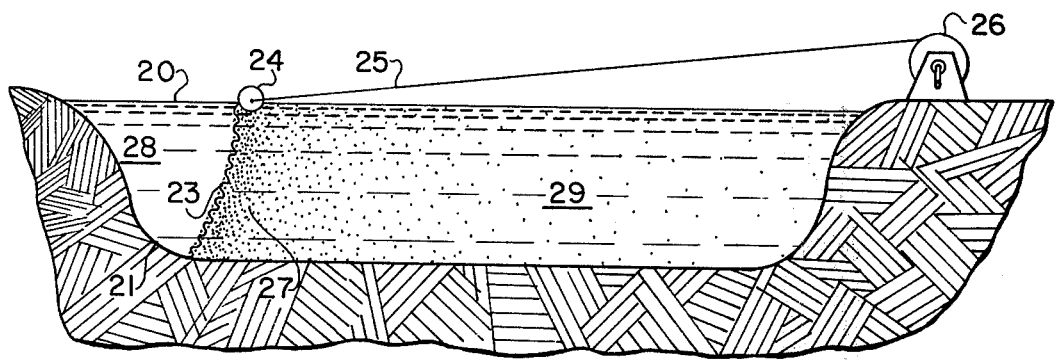
FIG. 2 shows an embodiment of this invention wherein a pond containing a very slow-settling suspension is clarified by dragging a screen from one end of the pond to the other end.

In FIG. 2 there is shown a cross-section of a pond filled with a very slow-settling suspension to the level 20 with the walls and bottom of the pond at 21. In this embodiment the suspension is treated to concentrate the solids therein by moving screen 23 from left to right through the pond by the action of winch 26 reeling-in cable 25 at the desired rate of speed to move screen 23 through the suspension in the approved manner. Screen 23 is shown to be supported by float 24 from which screen 23 hangs downwardly by gravity. Screen 23 could also be supported from above level 20 by a traverse mounted on rails mounted on rails running lengthwise of the pond. As the screen moves through the suspension the solids are concentrated as shown at 27 leaving the clarified liquid at 28 and the unaffected dispersion at 29. It is obvious that this embodiment can take on several variations. For example screen 23 might not be a freehanging screen but could be supported from a rigid frame or alternatively the freehanging screen could have weights attached to the bottom portions to maintain it in a somewhat stable taut condition. One preferred embodiment is to employ 2, 3, or 4 closely spaced screens aproximately parallel to each other in place of the single screen 23 in FIG. 2. This arrangement provides a an improved clarification performance. Many other arrangements can be imagined by those skilled in the techniques of engineering for accomplishing this same result with variations in the procedure, and yet embodying the principle of this invention.

Figure 3:
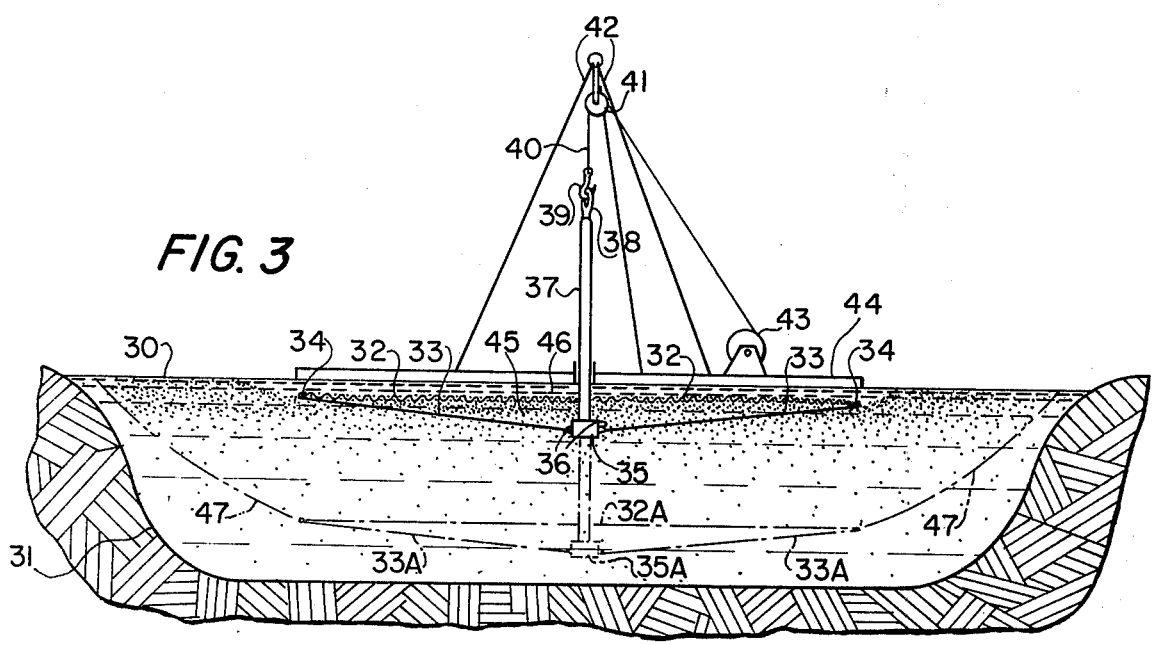
FIG. 3 shows an embodiment of this invention wherein a pond filled with a very slow-settling suspension is clarified by means of a large area screen which is moved slowly downward through the pond.

In FIG. 3 there is shown a pond similar to that described in FIG. 2 wherein a suspension has been introduced up to a level 30 and the walls and bottom of the pond are represented at 31. Over the surface 30 of the pond there is a platform 44 which may foat on the surface of the pond or be rigidly attached to the walls or bottom of the pond (no method of attachment being shown in this figure). On the platform is built a support rigging 42 which supports a pulley 41 through which cable 40 is threaded terminating in hook 39 to which is attached rod 38 hanging vertically downward through a hole in the platform 44. The other end of cable 40 is attached to winch 43 which is driven by a means not shown at a desired speed. The lower end of rod 37 is fitted with a collar 35 and a suitable number of hinges 36 to which are attached struts 33. The outer end of struts 33 is attached to screen 32 and the weight of struts 33 causes screen 32 to be taut by the force of gravity. When the pond is filled with suspension to the level 30 winch 43 is operated to raise the position of screen 32 to coincide with the surface 30. In performing the separation provided by this process screen 32 is slowly moved downwardly through the suspension at the desired rate to effect concentration of the solids ahead of the screen. In this drawing the solids are shown concentrated at 45 while clarified liquid remains behind the screen at 46. If a force greater than the weight of the assembly is needed to move the screen 32 at the desired rate, a supplemental driving force can be provided. In the operation of this invention there is a "drag effect" which causes concentration of solids to some extent outside the perimeter of screen 32. It is not known in full detail why this happens but it has been observed that the solids being forced ahead by the screen 32 are apparently attracted to other solids nearby and pull those solids along in the same direction to produce a considerable amount of concentration. For example when screen 32 has advanced far enough to be shown in the position 32A with the struts at 33A and collar at 35A the upper level of concentrated solids in the dispersions will be approximately at the position shown at 47 with all of the liquid above that location being clarified and all of the substance below that location comprising concentrated solids in liquid. Once the concentration has reached that point the suction line of a pump can be placed in the supernatant clarified liquid to pump off the liquid and leave the concentrated and compacted solids in the bottom for removal or for further concentration, e.g. by evaporation.

There are many other embodiments which can be designed embodying the principle of this invention and it is not intended that this invention should be limited in any fashion by these drawings but only that the invention be illustrated thereby.

DETAILED DESCRIPTION

This invention comprises a process for accelerating the separation of liquid from solids in a very slow-settling suspension such as a colloidal suspension, by moving one screen or a series of screens through the suspension at a substantially steady linear rate of less than about 1 foot (30.5 cm.) per day whereby the solids are concentrated ahead of the moving screen and the clarified liquid remains behind the moving screen. The suspension acts like a gel which can be compressed to squeeze liquid out of the suspension so as to effect a separation between the liquid and the solids. This process is applicable not only to aqueous dispersions known as slimes which frequently result from mining operations, but it also applies to suspensions wherein the liquid is non-aqueous. The largest known application for this process is found in the products resulting from mining operations wherein a mineral-bearing clay is dug from the ground, valuable minerals are recovered therefrom, and there is left as a by-product a stable suspension (i.e. one which settles at an extremely slow rate) of solid material in water. A typical example of such a by-product is the phosphate slime resulting from the treatment of phosphate clay mined in Florida. Another typical product is the suspension resulting from the treatment of bauxite to recover alumina and leaving a red clay slime which can be separated only with difficulty to recover the water and more alumina.

In the process of this invention a screen or netting, preferably of a rigid or semi-rigid construction, is moved slowly but steadily through the suspension at a rate which does not exceed about 1 foot (30.5 cm.) per day with the result that the solids are concentrated ahead of the moving screen leaving clarified water behind.

The screen which is employed can be a very large mesh screen generally varying from about 2-mesh to about 35-mesh in size. Smaller size screens will operate successfully but they provide a greater resistance to movement and thus it is advantageous to provide the largest openings that are feasible. The screen is desirably made of metal so as to provide some stiffness and rigidity, but it is entirely feasible to employ fiber or cloth netting, which for example might be drawn taut across a frame and produce the same results.

In certain embodiments of this invention it may be advantageous to employ multiple pairs of screens to simultaneously concentrate solids at several locations in the same suspension. For example, in the embodiment of FIG. 1, there may be two or more parallel screens 3 simultaneously moving downwardly through the suspension, each moving toward a separate fixed screen (substantially the same as screen 3 although preferably of slightly smaller mesh than the moving screen). Thus with a fixed screen at every 2 feet (61 cm.) of depth and a movable screen cooperating with each fixed screen and travelling toward the fixed screen at about 1 foot (30.5 cm.) per day, the entire tank of suspension can be clarified in two day's time. At each fixed screen there will be a concentration of solids produced by the motion of a travelling screen toward its respective fixed screen. This produces several layers of clarified liquid which can be drained off at one or at several levels if the drawoff rate is sufficiently low to prevent disturbance of the layers of concentrated solids.

It is somewhat difficult to predict precisely the optimum rate of movement of the screen through a given suspension to produce a desired separation. Nevertheless, it has been found that a maximum rate of about 1 foot per day is a practical limit. In operations on phosphate slimes it has been found that rates of about 4 to about 12 inches (10.2 to 30.5 cm.) per day represented optimum speeds for producing the desired separation.

The concentration effect of moving the screen through the suspension is not limited to the exact area of the screen. It appears that surrounding portions of the suspension are also compacted somewhat, even though they are not physically in contact with the screen. It is therefore an embodiment of this invention to employ a multiplicity of screens which are not connected with one another but are spaced apart from each other over the horizontal area of the surface as they move through the suspension. There is a "drag effect" which simultaneously causes some concentration of the solids beyond the perimeter of a screen although to a lesser degree than the concentration of solids immediately ahead of the screen.

It is contemplated that in the process of this invention there may be instances where it is advantageous to employ a flocculant material to cause the particles in the solid suspension to agglomerate and thereby to facilitate concentration. Such a flocculant material may be added to the entire surface of the suspension. In a particular embodiment of this invention it has been found that if the flocculant is added continuously or periodically at the interface between the moving screen and the concentrated solids a desirable effect is produced with a greatly reduced amount of flocculant because the flocculant dosage is based on the relatively small volume of suspension available to the flocculant at the interface of the unclarified suspension and the supernatant. The addition of flocculant to this interface can be readily accomplished by incorporating into the supporting structure for the screen a means for injecting flocculant as desired. The supporting structure may, for example, include hollow conduits for distributing the flocculant to any desired location or, alternatively, the supporting structure may also support a separate feed-system of tubing for distributing the flocculant at the desired locations. Among the flocculant materials which may be employed are starches such as those obtained from corn, potato, arrowroot, etc.; and polyelectrolytes, which may be anionic or cationic. Typical of the polyelectrolytes are polyacrylamide or its salts, hydrolyzed polyacrylamide or its salts, polyacrylic acid or its salts, etc. Many other materials are known to be useful as flocculants, and it is not critical to this invention that any particular variety be employed. It is only important that it have the ability to agglomerate the colloidal particles so as to facilitate the concentration of the solids.

There are many methods for employing this process in a commercial process. Since it is common practice for an industry to collect a very slow-settling suspension or slime in a large open pond, methods must be available for concentrating these solids in such ponds. One of such methods is to employ a barge or raft which floats on the surface of the pond and from which a large screen is supported and is pushed downward through the liquid at the required rate of travel. The screen might be a single unit or there can be several separate units working in concert and located closely adjacent to each other over the surface area of the pond. As a single unit the raft could be fitted with a rod capable of supporting the large screen in a position parallel to the surface of the pond and with means of moving the rod and screen downward at the slow rate of travel indicated previously herein. It is not necessary that the screen have an overall area comparable to the entire area of the pond because concentration occurs beyond the perimeter of the screen through a "drag effect." Accordingly, a barge or raft located in the center of the pond can concentrate the solid material directly below the screen to a maximum extent while concentration occurs to a lesser extent further and further away from the screen with the result that the volume of clarified liquid assumes a shape approaching that of an inverted cone. Alternatively, there might be several independent crane structures on a single raft each supporting a separate screen and means for independently advancing the screen downward through the suspension at the required rate. If the screens are relatively close to each other, the solids will concentrate almost equally well between the screens as immediately ahead of each screen. In this fashion a relatively large area can be concentrated at one time.

Another procedure for employing the process of this invention in a commercial fashion is to provide enough large tanks to handle the effluent suspension from the industrial operation and to provide each tank with a large screen and a means of moving the screen downwardly through the depth of the tank at the desired rate of travel. By utilizing this type of operation the first tank to be filled is immediately subjected to the concentration operation, which might, for example, require 3–6 days. While the first tank is being subjected to the concentration process one or more other tanks are filled and the concentration treatment is started. After sufficient concentration the supernatant liquid is pumped off, the solids removed, and the operation is started again. Another procedure which may be used in an open pond is to employ a net which stretches over a large area of the pond and which has a mesh size of the specifications mentioned above. The net is weighted so that it will move slowly down through the liquid at the desired rate or it can be driven downwardly by means described above. It is also possible to perform the concentration in a horizontal direction rather than in a vertical direction and for this purpose a screen or net might be supported across the width of the pond and the entire net dragged the length of the pond at the linear rates mentioned above to produce the concentration of solids ahead of the screen and to leave the clarified liquid behind the screen. This invention also encompasses the embodiment wherein the screen remains stationary and the suspension is moved through the screen at a very slow rate such that the relative movement of the screen to the suspension is within the limits of linear travel given above. A means for employing this concept in a commercially acceptable fashion is to place in the pond a large diameter pipe or several small diameter pipes with pipe walls constructed of the screen having the mesh size described above. The liquid is pumped from the pipe at such a rate that the suspension outside the pipe moves toward and through the pipe wall at the linear rates given above. This is substantially the reverse of the embodiments mentioned above but it is an operable procedure which may be preferred in certain situations.

It has been found advantageous in certain embodiments of this invention to provide a forwardly projecting shearing element or a multiplicity of such elements to pierce and shear the compacting solids immediately ahead of the moving screen. These shearing elements can take any of several forms and shapes but a common one is the shape of a pin or needle projecting forward ahead of the screen into the aera of the solids that are being concentrated. It is of course not necessary that this be rod-like since the shearing element could be in the form of a knife blade or other type of projection which does not impede the flow of liquid through the screen nor the concentration of the solids ahead of the screen. The actual size of the projections will vary with the size of the screen and the dimensions of the concentrated solids. Normally the length of the projections will not be more than 1–2 feet in a commercial operation. It is advantageous to employ a large number of such projections in a single screen with each projection being small in diameter, e.g. not exceeding one inch. The precise reason why such projections are useful is not fully known but it is believed that it has something to do with providing easy exits for water to flow away from the concentrating solids and thus facilitates the concentrating action. These projections are not necessary to the operation of this process, they are merely expedients to be used in certain situations where it would appear to be of assistance in operating the process.

Another embodiment of this invention is a slowly rotating thickener with rakes constructed of screen material at the bottom of the container which holds the suspension. The thickener rake elements are fabricated of screen to obtain improved performance over thickeners with conventional rakes by concentrating the solids as described above when the screen shears the suspension as it moves through the liquid. This embodiment is operable to effect concentration when used by itself, or alternatively it can be used in conjunction with other moving screens as described in the foregoing explanation of this invention.

Although this invention has been described in detail with reference to certain embodiments thereof, it will be understood that variations and modifications can be effected within the spirit and scope of the invention and as defined in the appended claims.

I claim:

1. A process for accelerating the separation of water from solids contained in phosphate slimes which comprises moving a porous shearing device having openings smaller than 2 mesh but substantially larger than the particles contained in said slimes through said slimes at a substantially linear rate of less than one foot per day whereby the solids are concentrated ahead of the moving shearing device.

2. The process of claim 1 wherein said shearing device is a screen.

3. The process of claim 2 wherein said screen is from 2-mesh to 35-mesh in size.

4. The process of claim 1 wherein a flocculant material is added to the suspension.

5. The process of claim 4 wherein the flocculant material is added to the suspension at the leading surface of the shearing device.

6. The process of claim 1 wherein said rate is from about 4 to 12 inches per day.

7. The process of claim 2 wherein said screen is a rigid to semi-rigid structure.

* * * * *